March 13, 1956  H. E. SIVERSON ET AL  2,737,830
FILING GUIDE FOR CHAIN SAW TEETH
Filed May 31, 1955
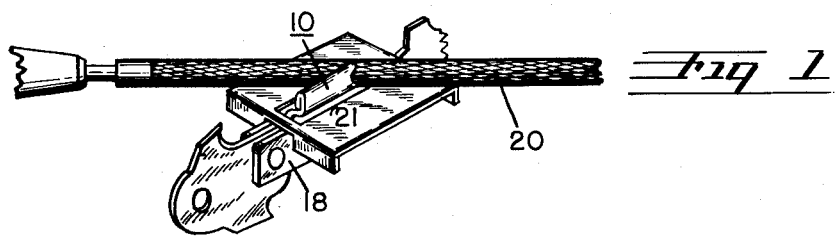
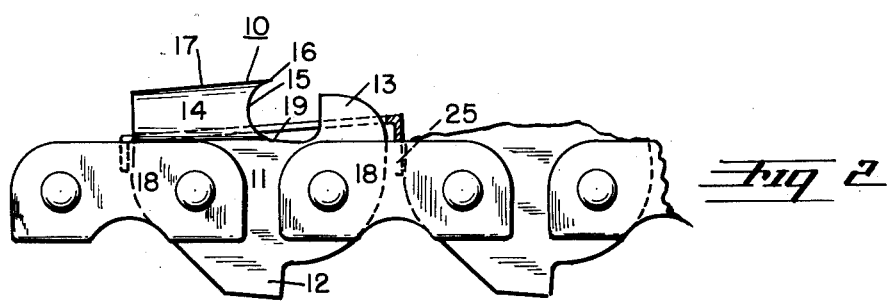
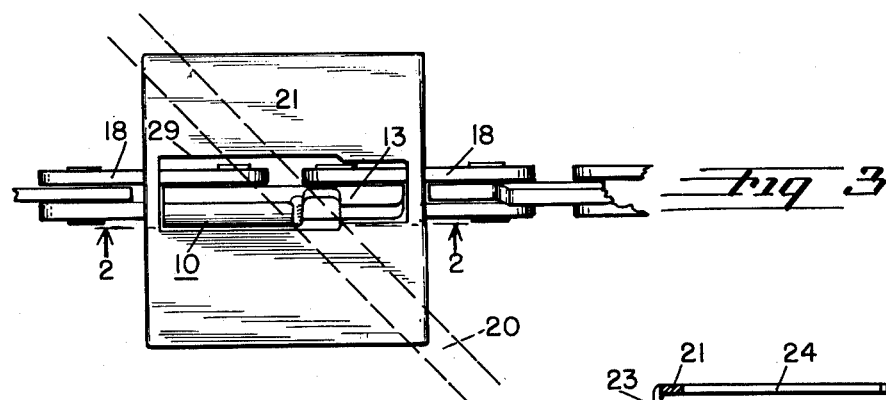
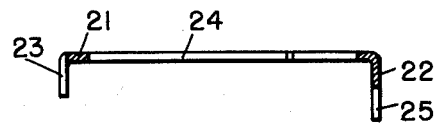
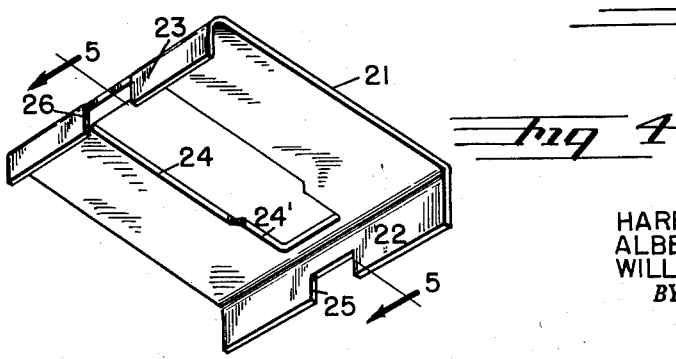
INVENTORS
HARRY E SIVERSON
ALBERT M HAUER
WILLIAM W. TUBESING
BY
ATTORNEY

United States Patent Office 2,737,830
Patented Mar. 13, 1956

2,737,830

FILING GUIDE FOR CHAIN SAW TEETH

Harry E. Siverson, Albert M. Hauer, and William W. Tubesing, Portland, Oreg., assignors to Beaver Saw Chain Corp., Portland, Oreg., a corporation of Oregon Application May 31, 1955, Serial No. 511,868

4 Claims. (Cl. 76—31)

This invention relates in general to the sharpening or filing of cutting teeth in saw chains wherein the forward or cutting edges of the teeth are curved and slope obliquely with respect to the direction of travel of the saw chain, the various cutting edges being of left and right configuration.

More particularly, this invention relates to the sharpening of saw teeth in which the curved bevelled cutting edge requires the use of a cylindrical or round file for the purpose of sharpening. One of the main problems in the sharpening of saw chains embodying such teeth is the difficulty of maintaining uniformity in the curved cutting edges of the teeth. Thus, if, in the sharpening operation, the round file is held slightly higher or slightly lower for some teeth than for others, marked differences in the cutting edges of the teeth, and consequently marked differences in the work done by the individual teeth will result.

For example, the sharpening of the cutting edge of such tooth with a round file held at too low a position with respect to the cutting edge will result in producing a more pronounced hook formation at the cutting tip; and similarly the sharpening of the cutting edge with the file held too high will result in a reduced hook formation or may even eliminate any hook formation entirely, although a moderate amount of hook formation or curvature is to be desired. When the hook formation is not uniform in the teeth of a saw chain, the teeth with the most amount of hook formation do the most work, but a tooth having an excessive hook formation will grab and cause uneven operation of the saw while the other teeth, which have too little hook formation, will perform comparatively little work. With too pronounced a hook formation there is an increased tendency for the tip or hook of the tooth to break off. Furthermore, when the sharpening of the tooth takes place with the file held too low on the hook the repeated cutting away of the part of the shank or body of the tooth may weaken the tooth and increase the likelihood of breakage of the entire tooth.

An object of the present invention is to provide a simple and practical guide, intended especially for use with cylindrical or round files, which will insure the positioning of the file at the right height on the tooth, and at the same relative height for all the teeth of the saw.

It is customary with several types of chain saw teeth to have the top or outer edge or ridge of the tooth taper slightly downwardly or inwardly from the tip or toe to the rear of the tooth. Such a sloping top or outer ridge will be noted in the teeth of the saw chain shown in U. S. Patent to Cox, No. 2,508,784, dated May 23, 1950, and in the especially formed teeth described in my pending application, Serial No. 404,477, filed under date of January 18, 1954, and entitled "Saw Chain." The rearwardly sloping outer ridge is an advantage in reducing friction.

However, the sharpening of such teeth with the rearwardly sloping outer ridge presents an additional problem since the repeated sharpening with the round file and resulting wearing away of the front cutting face causes the cutting tip or hook to be positioned a slightly less distance from the body of the tooth. Consequently, if the same sharpening file is used and is held at exactly the same height for worn teeth as for new teeth in the chain, the hook formation will gradually decrease with each additional filing and the resharpened worn teeth will cut with less efficiency.

An additional and important object of the present invention is to provide an improved filing guide which will maintain the proper file height as the tooth is filed and thus will result in the same amount of curvature or hook formation on an old or worn tooth as with a new tooth.

A further object of the invention is to provide a filing guide for use with saw teeth of the type indicated which will be very inexpensive to manufacture and very simple and convenient to use, and the use of which will enable even the most inexperienced filer to perform a satisfactory tooth sharpening operation.

The manner in which these objects and incidental advantages are attained with this improved filing guide will be readily understood with reference to the accompanying drawings.

In the drawings:

Figure 1 is a perspective view illustrating the employment of the improved filing guide in the sharpening of a chain saw tooth having a curved cutting edge;

Figure 2 is a fragmentary elevation of the saw chain showing the same tooth drawn to a larger scale and showing the filing guide in section, the section of the guide being taken approximately on line 2—2 of Figure 3;

Figure 3 is a corresponding top plan view of the saw tooth in the chain with the filing guide in place on the tooth, the position of the sharpening file being indicated by broken lines;

Figure 4 is a perspective view of the filing guide by itself, the view being taken from underneath the guide; and Figure 5 is a sectional elevation of the guide taken on line 5—5 of Figure 4.

The chain saw tooth with which the filing guide is illustrated in use with Figures 1, 2 and 3 is designated in general by the reference character 10 and, as shown more clearly in Figure 2, comprises a shank or main body portion 11 having a guide wing or sprocket tooth portion 12 on the inner or non-working edge of the saw, a rider portion or depth gauge 13 on the outer portion of the saw, and the working portion 14 of the tooth, which preferably is formed with an extra or double thickness of metal.

The forward face or cutting edge 15 of the working portion 14 of the tooth is curved and bevelled and has a partial hook formation which terminates forwardly and outwardly in a cutting, chisel-edge toe or tip 16. It will be noted from Figure 2 that the top or outer edge line 17 of the working portion 14 slopes slightly downwardly and rearwardly. As usual, the tooth is connected by pairs of links 18 to adjacent members or teeth in the saw chain.

For sharpening or filing a tooth of this type, having a curved cutting face, a round file is used, such as illustrated at 20 in Figure 1. However, as will be readily understood from Figure 2, if no guide or other means were used for holding the round file at the proper height, it would be possible, by holding the file too high, to cut away the toe or tip 16 entirely; and similarly, by holding the file too low, it would be possible to undercut the edge below the tip excessively which would result in an extended tip or hook which would cause the tooth to grab too much and which would also have more tendency to break off; and further, the cutting away of more of the groove 19 between the tooth gauge or rider 13 and the cutting face 15, as a result of holding the file too low, would weaken the shank portion 11. The use of the filing guide removes the likelihood of the file being held either too high or too low regardless of the extent to which the tooth is worn.

The filing guide consists of a rectangular piece of metal, preferably hardened steel, formed with a flat top portion 21, with a downwardly extending front wall 22 (Figures 4 and 5) and a downwardly extending rear wall 23. The top portion 21 is provided with a central longitudinally-extending slot 24, the total length of which is slightly greater than the length of the tooth, that is to say slightly greater than the distance between the front edge of the tooth gauge or rider 13 and the rear wall of the working portion 14, as indicated in Figures 2 and 3.

The width of the slot 24, as shown in Figure 3, is sufficient to enable the guide to be easily set in place over the tooth regardless of the extent to which the working portion of the tooth is offset on either side. Preferably, but not necessarily, the slot 24 is made slightly narrower at the front end where the slot passes around the rider or gauge 13 since the rider is of less thickness than the working portion of the tooth. This narrower portion indicated at 24' in Figure 4 also prevents any likelihood of the guide being inadvertently set on the tooth in the reverse position.

A central notch 25 is cut in the front wall 22 of the guide. The width of this notch is approximately equal to the width of the saw chain. In other words, the width of the notch 25 is such that it will enable the side walls of the notch to extend down over the outer faces of the pair of connecting links 18 of the saw chain which are joined to the front end of the tooth being sharpened. The rear wall 23 has a central notch 26 of the same width as the notch 25. Thus, when the filing guide is set in place over the tooth to be filed the front notch 25 will extend down on the pair of connecting links 18 at the front of the tooth and the notch 26 will extend similarly down on the pair of connecting links at the rear of the tooth, and the guide will be held in place on the tooth as a result.

As shown in Figures 4 and 5, and also as indicated in Figure 2, the front wall 25 of the guide extends down further from the top 21 than the rear wall 23, and while the notch 26 in the rear wall extends up to the top portion 21, the notch 25 terminates below the top portion 21. Consequently, when the guide is set in place on the tooth the top 21 will slope rearwardly instead of being horizontal or parallel to the top edges of the successive pairs of connecting links 18. This rearward slope of the top portion 21 of the guide is made to correspond exactly to the rearward slope of the top edge 17 of the working portion 14 of the tooth. Thus, the top face of the guide when the guide is set in place on the tooth, will be exactly parallel to the top edge 17 of the working portion of the tooth to be sharpened. This is a very important feature of the guide as will now be further pointed out.

When the guide has been set in place around the tooth to be sharpened, as indicated in Figures 1, 2 and 3, the operator holds the file in horizontal position, resting on the guide, and preferably holds the file with both hands at opposite ends of the file. Since the teeth are generally sharpened at a 45 degree bevel, the file is moved diagonally back and forth on the guide as indicated. As long as the file rests on the guide, provided the proper size file is used, any likelihood of the tooth being filed too high or too low is avoided, and by using the same file with the guide for all the cutting teeth of the chain uniformity in the curvature of the cutting edges is assured regardless of the number of times the teeth are sharpened.

We claim:

1. In a filing guide for use on a saw chain of the character described, a metal plate formed with a flat top portion and downwardly extending front wall, said top portion having a length slightly greater than the length of a tooth to be sharpened and having a width considerably greater than the saw chain, said front wall extending transversely with respect to said saw chain when said guide is in place, a longitudinally-extending slot in said top portion, said slot having a length corresponding approximately to the length of the tooth, the width of said slot being greater than the width of the tooth, said slot enabling said guide to be placed around the tooth on the saw chain, a notch in said front wall, said notch being of proper width to cause said notch to fit over the sides of the connecting links at the forward end of the tooth when said guide is placed on the saw chain, said notch terminating a sufficient distance below said top portion to cause said top portion to have a slight rearward slope paralleling the top edge of the working portion of the tooth when the guide is set in place on the tooth on said saw chain.

2. A filing guide for use on a saw chain, the teeth of which saw chain have working portions formed with rearwardly sloping top edges and are provided with curved cutting front edges, said guide including a metal plate formed with a rectangular flat top portion and downwardly extending front and rear walls, said top portion having a length slightly greater than the length of a tooth to be sharpened and having a width considerably greater than the saw chain, said front and rear walls extending transversely with respect to said saw chain when said guide is in place, a central longitudinally-extending slot in said top portion, said slot having a length corresponding approximately to the length of the tooth, the width of said slot being greater than the thickness of the saw chain, said slot enabling said guide to be placed around the tooth on the saw chain, a centrally positioned notch in said front wall, the width of said notch corresponding to the width of said saw chain, said notch terminating a sufficient distance below said top portion to cause said top portion to have a slight rearward slope paralleling the top edge of the working portion of the tooth when the guide is set in place on a tooth of the saw chain.

3. A filing guide for use on a saw chain, the teeth of which saw chain have working portions formed with rearwardly sloping top edges and are provided with curved cutting front edges, said guide including a rectangularly shaped metal plate formed with a flat top portion having a length slightly greater than the overall length of a tooth to be sharpened and having a width considerably greater than the saw chain, said front and rear walls extending transversely with respect to said saw chain when said guide is in place, a central longitudinally-extending slot in said top portion, said slot having a length corresponding approximately to the length of the tooth, the width of said slot slightly greater than the overall thickness of the saw chain, a notch in said front wall, and a notch in said rear wall in alignment with said front wall notch, the width of said notches corresponding to the width of said saw chain, said front wall notch terminating a sufficiently greater distance below said top portion than said rear wall notch to cause said top portion to have a slight rearward slope paralleling the top edge of the working portion of the tooth when the guide is set in place on a tooth of the saw chain.

4. A filing guide for use on a saw chain, the teeth of which saw chain have working portions formed with rearwardly sloping top edges and are provided with curved cutting front edges, said teeth being attached in said chain by pairs of connecting links, said guide comprising a metal plate formed with a rectangular flat top portion and downwardly extending front and rear walls, said top portion having a length slightly greater than the length of a tooth to be sharpened and having a width considerably greater than the saw chain, said front and rear walls extending transversely with respect to said saw chain when said guide is in place, a central longitudinally-extending slot in said top portion, said slot having a length corresponding approximately to the length of the tooth, the width of said slot through its main extent being slightly greater than the overall thickness of the saw chain, said slot being slightly narrower at the front end portion, said slot enabling said guide to be placed around the tooth on the saw chain, a centrally positioned notch in said front wall, and a centrally positioned notch in said rear wall, said notches being of proper width to cause said notches to fit over the sides of the connecting links at the corresponding ends of the tooth when said guide is placed on the saw chain, said rear wall notch extending up to said top portion and said front wall notch terminating a sufficient distance below said top portion to cause said top portion to have a slight rearward slope paralleling the top edge of the working portion of the tooth when the guide is set in place on a tooth of the saw chain.

No references cited.